United States Patent
Kim et al.

(10) Patent No.: US 11,115,087 B2
(45) Date of Patent: Sep. 7, 2021

(54) METHOD FOR DISTRIBUTED ANTENNA-BASED COMMUNICATION DEVICE TO PERFORM COMMUNICATION BASED ON INTER-PANEL INTERFERENCE

(71) Applicant: LG ELECTRONICS INC., Seoul (KR)

(72) Inventors: Dongkyu Kim, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/762,033

(22) PCT Filed: Nov. 15, 2017

(86) PCT No.: PCT/KR2017/012908
§ 371 (c)(1),
(2) Date: May 6, 2020

(87) PCT Pub. No.: WO2019/098398
PCT Pub. Date: May 23, 2019

(65) Prior Publication Data
US 2020/0343944 A1 Oct. 29, 2020

(51) Int. Cl.
*H04B 7/0408* (2017.01)
*H04W 24/08* (2009.01)
*H04W 72/04* (2009.01)

(52) U.S. Cl.
CPC .......... *H04B 7/0408* (2013.01); *H04W 24/08* (2013.01); *H04W 72/0413* (2013.01)

(58) Field of Classification Search
CPC .............. H04L 37/0408; H04W 24/08; H04W 72/0413; H04W 16/28; H04W 24/10; H04B 7/0695; H04B 7/088; H04B 7/0874; H04B 7/0691; H04B 15/02
See application file for complete search history.

(56) References Cited

U.S. PATENT DOCUMENTS

| | | | | |
|---|---|---|---|---|
| 2016/0349365 | A1* | 12/2016 | Ling | G01S 7/2813 |
| 2017/0264347 | A1 | 9/2017 | Le-Ngoc | |
| 2019/0140811 | A1* | 5/2019 | Abedini | H04B 7/0404 |
| 2020/0059290 | A1* | 2/2020 | Pan | H04B 7/0695 |

FOREIGN PATENT DOCUMENTS

| | | |
|---|---|---|
| KR | 101580155 | 12/2015 |
| KR | 20160113869 | 10/2016 |
| WO | 2017007172 | 1/2017 |
| WO | 2017095467 | 6/2017 |

OTHER PUBLICATIONS

PCT International Application No. PCT/KR2017/012908, International Search Report dated Aug. 10, 2018, 23 pages.

* cited by examiner

*Primary Examiner* — Hashim S Bhatti
(74) *Attorney, Agent, or Firm* — Lee, Hong, Degerman, Kang & Waimey (57) ABSTRACT

A method for a distributed antenna-based communication device to perform communication based on inter-panel interference may comprise: a step of measuring interference between transmission beams of a transmission panel and reception beams of a reception panel; a step of configuring inter-panel beam pair information by pairing the beams of the transmission panel and the beams of the reception panel on the basis of the measurement; and a step of transmitting the inter-panel beam pair information to a base station or an adjacent communication device.

16 Claims, 8 Drawing Sheets

METHOD FOR DISTRIBUTED ANTENNA-BASED COMMUNICATION DEVICE TO PERFORM COMMUNICATION BASED ON INTER-PANEL INTERFERENCE

CROSS-REFERENCE TO RELATED APPLICATIONS

This application is the National Stage filing under 35 U.S.C. 371 of International Application No. PCT/KR2017/012908, filed on Nov. 15, 2017, the contents of which are all hereby incorporated by reference herein in their entirety.

TECHNICAL FIELD

The present disclosure relates to wireless communication, and more particularly, to a method for performing communication based on inter-panel interference by a distributed antenna-based communication device.

BACKGROUND ART

Compared to conventional half duplex communication in which time or frequency resources are divided orthogonally, full duplex communication doubles a system capacity in theory by allowing a node to perform transmission and reception simultaneously.

Figure 1:
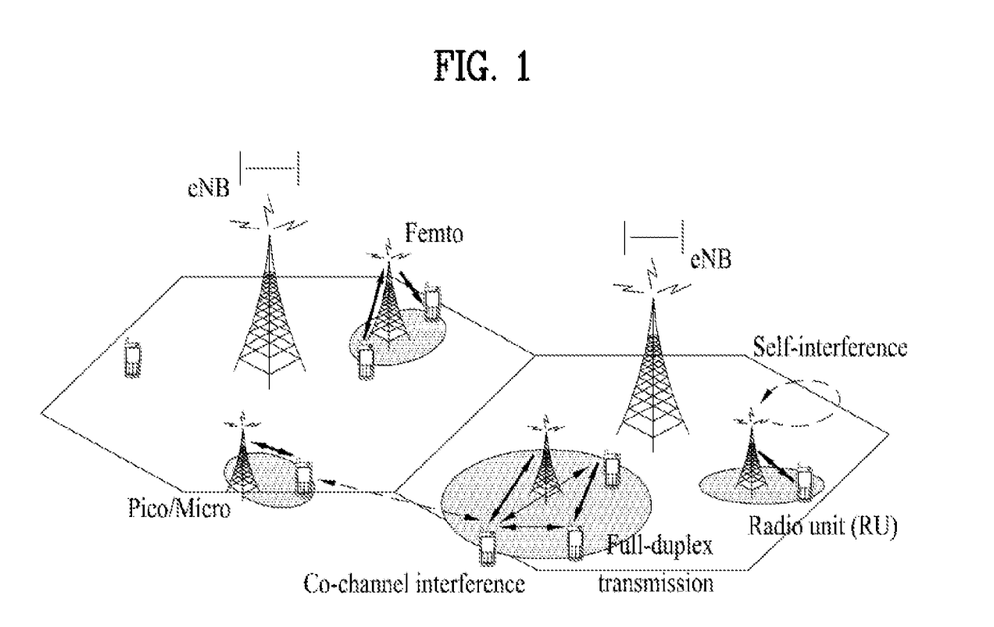
FIG. 1 is a diagram illustrating a network supporting a full-duplex/half-duplex communication operation scheme of a UE, which is proposed in the present disclosure.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present disclosure is to provide a method for performing communication based on inter-panel interference by a distributed antenna-based communication device.

Another object of the present disclosure is to provide a distributed antenna-based communication device for performing communication based on inter-panel interference.

The technical objects that can be achieved through the present disclosure are not limited to what has been particularly described hereinabove and other technical objects not described herein will be more clearly understood by persons skilled in the art from the following detailed description.

Technical Solution

To achieve one object of the present disclosure, a method for performing communication based on inter-panel interference by a distributed antenna-based communication device may comprise measuring interference between transmission beams of a transmission panel and reception beams of a reception panel; configuring inter-panel beam pair information by pairing the beams of the transmission panel and the beams of the reception panel on the basis of the measurement; and transmitting the inter-panel beam pair information to a base station or a neighboring communication device.

The inter-panel beam pair information may include one or more of pair information of a transmission beam index of the transmission panel and a reception beam index of the reception panel. The inter-panel beam pair information includes a best pair or a worst pair, and the best pair is a pair of a best transmission beam index and the reception beam index and the worst pair is a pair of a worst transmission beam index and the reception beam index.

The inter-panel beam pair information may be transmitted periodically. The inter-panel beam pair information may be transmitted non-periodically if a specific condition is satisfied. The specific condition may be satisfied when a predetermined difference occurs between an inter-beam interference measurement value of panels and an inter-beam interference measurement value of previous panels.

The communication device may include a vehicle. The transmission beams correspond to analog transmission beams, and the reception beams correspond to analog reception beams. The inter-panel beam pair information is transmitted through a physical uplink control channel (PUCCH) or a physical uplink shared CH (PUSCH). The transmission panel operates in a transmission mode, and the reception panel operates in a reception mode.

To achieve another object of the present disclosure, a distributed antenna based communication device for performing communication based on inter-panel interference comprises a transmission panel; a reception panel; and a processor configured to measure interference between transmission beams of the transmission panel and reception beams of the reception panel and configured to configure inter-panel beam pair information by pairing the beams of the transmission panel and the beams of the reception panel based on the measured result, wherein the processor may be configured such that the transmission panel transmits the inter-panel beam pair information to a base station or a neighboring communication device.

The inter-panel beam pair information may include one or more of pair information of a transmission beam index of the transmission panel and a reception beam index of the reception panel. The inter-panel beam pair information may include a best pair or a worst pair, and the best pair may be a pair of a best transmission beam index and the reception beam index and the worst pair may be a pair of a worst transmission beam index and the reception beam index.

The inter-panel beam pair information may be transmitted periodically. The inter-panel beam pair information may be transmitted non-periodically if a specific condition is satisfied.

Advantageous Effects

Inter-panel beam pair information may be configured in accordance with information on interference measured between a panel operating in a transmission mode and a panel operating in a reception mode in a distributed antenna based vehicle, whereby communication throughput may be improved.

Effects obtainable from the present disclosure may be non-limited by the above mentioned effect. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure, illustrate embodiments of the disclosure and together with the description serve to explain the principle of the disclosure.

BEST MODE FOR CARRYING OUT THE DISCLOSURE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

Figure 2:
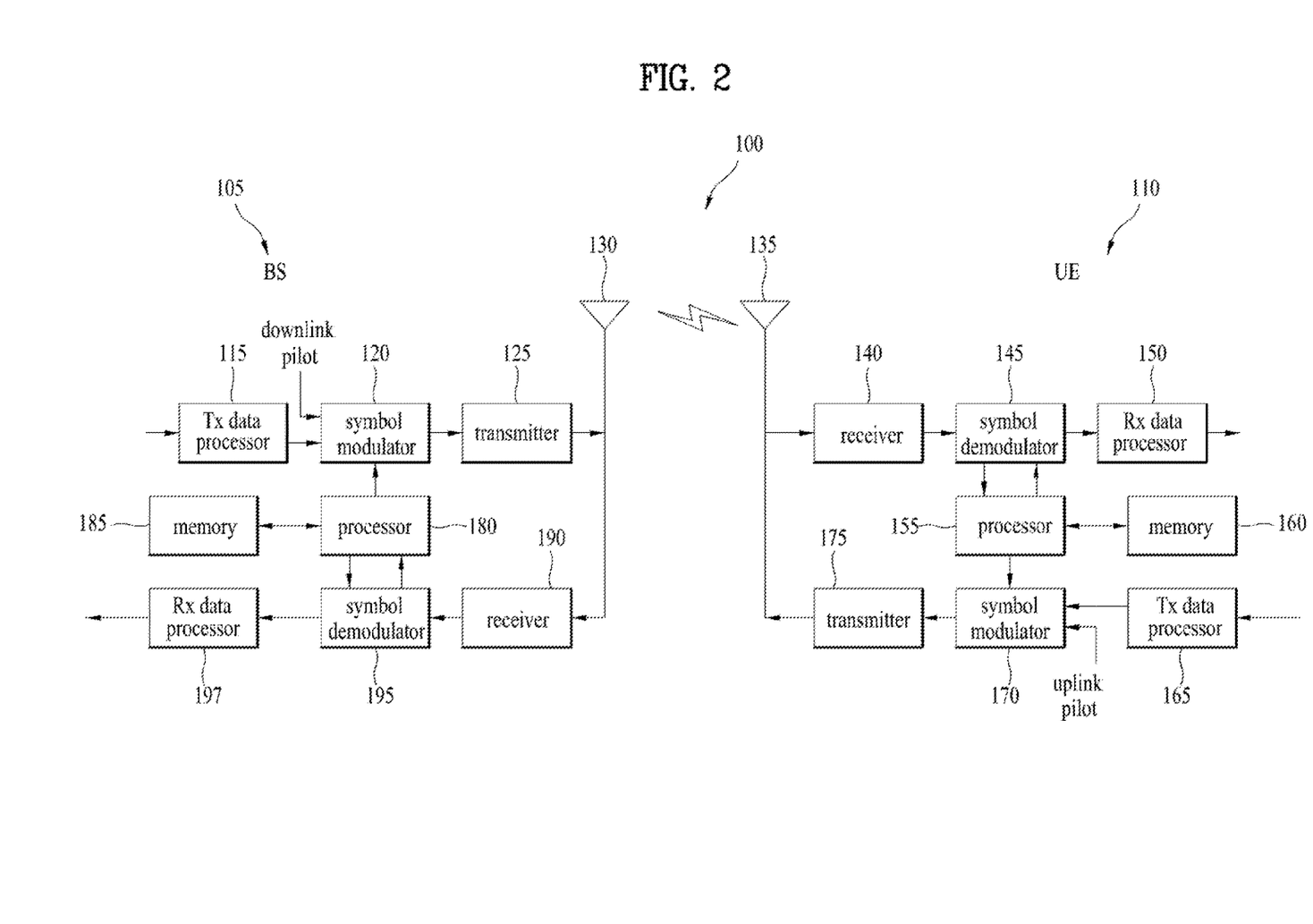
FIG. 2 is a block diagram of configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
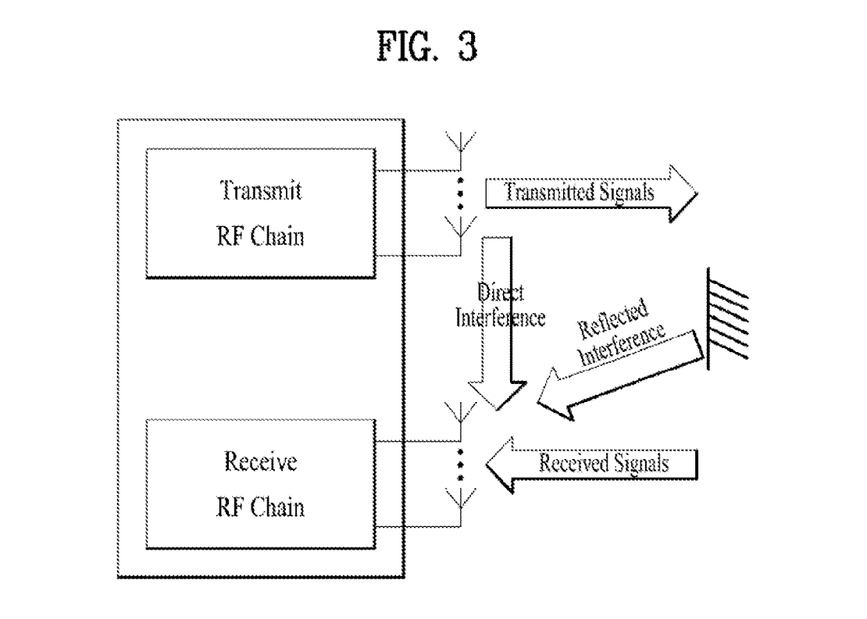
FIG. 3 is a diagram illustrating the concept of a transmission/reception link and self-interference (SI) in an FDR communication situation.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 1 below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{OBW}$=−174 dBm+10×$\log_{10}$(BW). In Table 1, the thermal noise value is calculated on the assumption of a 20-MHz BW. In relation to Table 1, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
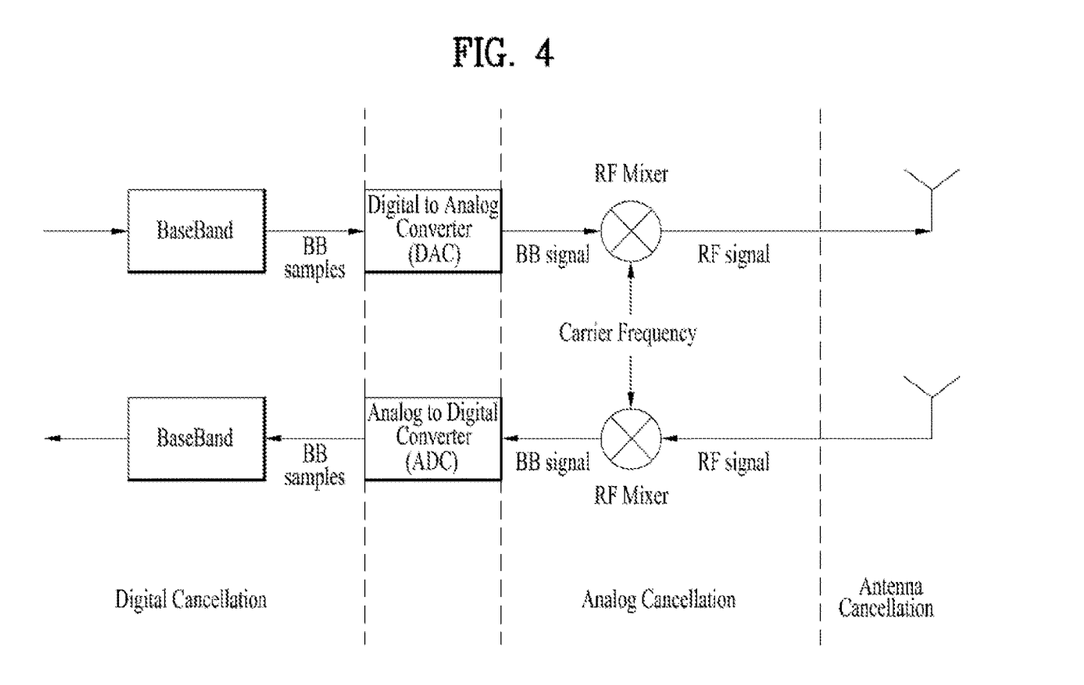
FIG. 4 is a diagram illustrating positions at which three Self-IC schemes are applied, in an RF Tx and Rx end (or an RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
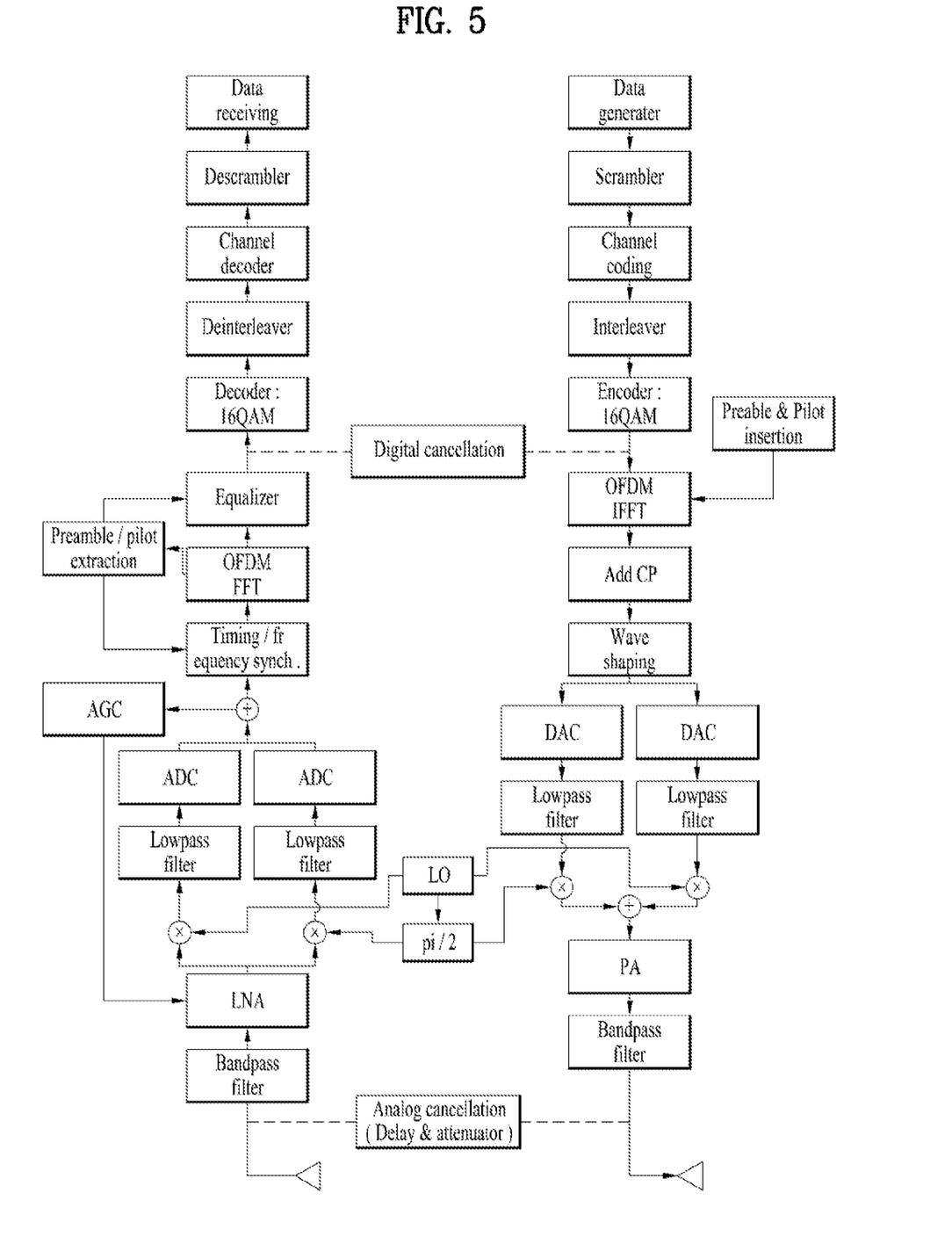
FIG. 5 is a block diagram of a Self-IC device in a proposed communication apparatus in an OFDM communication environment based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Hereinafter, the present disclosure is intended for self-interference cancellation in a UE (particularly, vehicle), and more particularly, suggests a method for performing self-interference cancellation by using an idle transmission module of a panel operating in a reception mode in a distributed antenna structure.

Space division duplex considered in the present disclosure is a scheme for independently managing a communication link of each antenna by performing space division for each antenna. In order to independently manage a communication link per antenna, self-interference between antennas owned by a UE should be removed, and interference between UEs included in a communication link should be reduced.

As a scheme for removing self-interference between antennas owned by a UE, there is an analog and digital self-interference cancellation scheme or a scheme for reducing self-interference by making sure of a distance between antennas. Since the scheme for reducing self-interference by making sure of a distance between antennas has lower complexity than that of the analog and digital self-interference cancellation scheme, the scheme for reducing self-interference by masking sure of a distance between antennas is easily applicable to the system. The scheme for reducing self-interference by masking sure of a distance between antennas may be applied by making sure of a distance between antennas in a vehicle UE larger than the existing communication UE. An inter-cell interference reduction scheme of the existing cellular communication system may be applied to the scheme for reducing interference between UEs. In current cellular communication at a high frequency band of 6 GHz or more, since a narrow beam width is formed for a communication distance, it is considered that the probability of interference due to overlapped beams of neighboring cells is low. Also, it is likely that a signal may be blocked by an object due to linearity of the signal. Since a vehicle has a surface made of iron and a big size, the vehicle is likely to block a high frequency signal of a neighboring UE.

Space division communication is easily applicable to high frequency communication between vehicles having distributed antennas due to the above characteristics. If space division communication is applied, since links of antennas are isolated from one another, transmission and reception timing points of the respective communication links may be allocated differently and frequency resources may be reused in each communication link.

Figure 6:
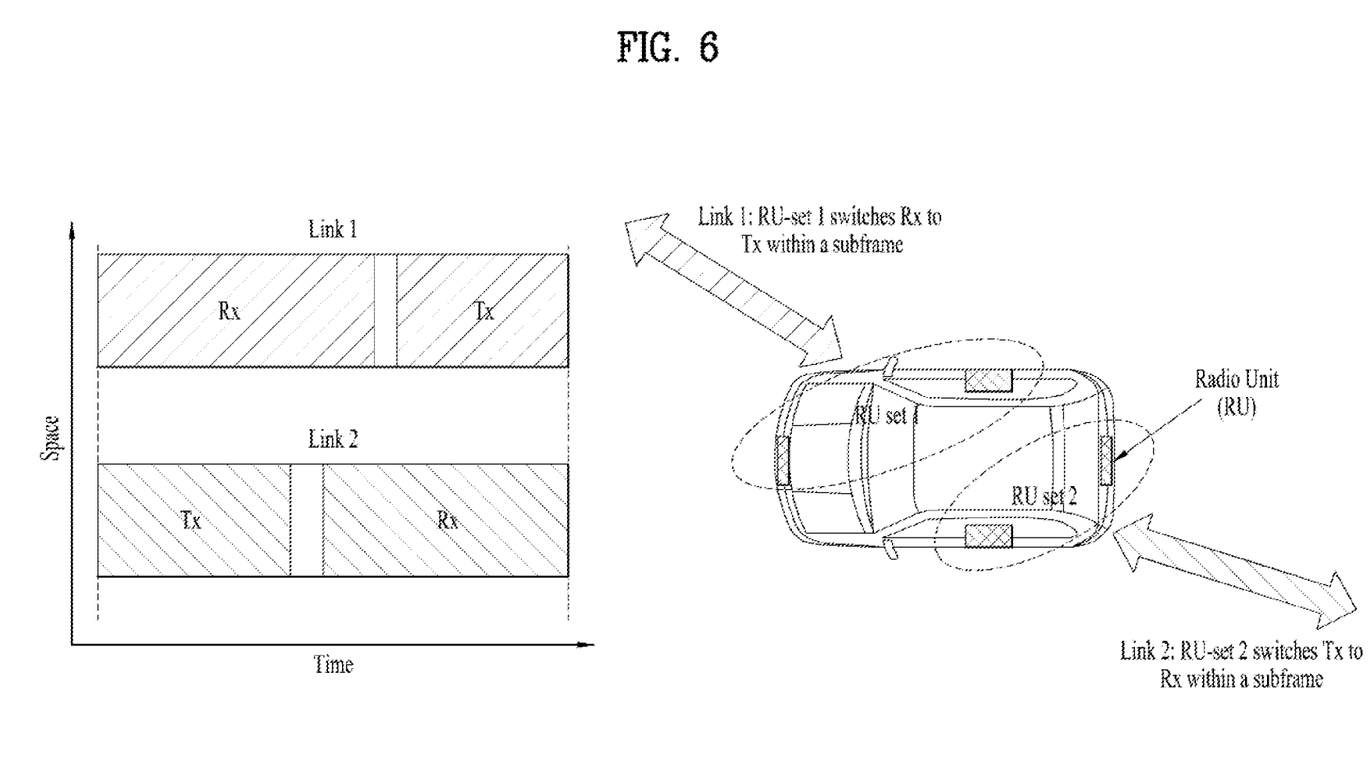
FIG. 6 is a diagram illustrating application of a spatial division communication (SDD) in a vehicle to which distributed antennas are applied.

FIG. 6 is a diagram illustrating application of a spatial division communication (SDD) in a vehicle to which distributed antennas are applied.

In FIG. 6, a link 1 and a link 2 are communication links connected with different devices (UE or base station). The amount of Tx resources and Rx resources may be changed depending on a status of each communication link, and Tx timing point and Rx timing point may also be changed. A radio unit (RU) shown in FIG. 6 is an antenna module that includes a plurality of antennas. In this case, a UE includes four RUs which are distributed. Two of four RUs are used to form the link 1, and the other two RUs are used to form the link 2.

Figure 7:
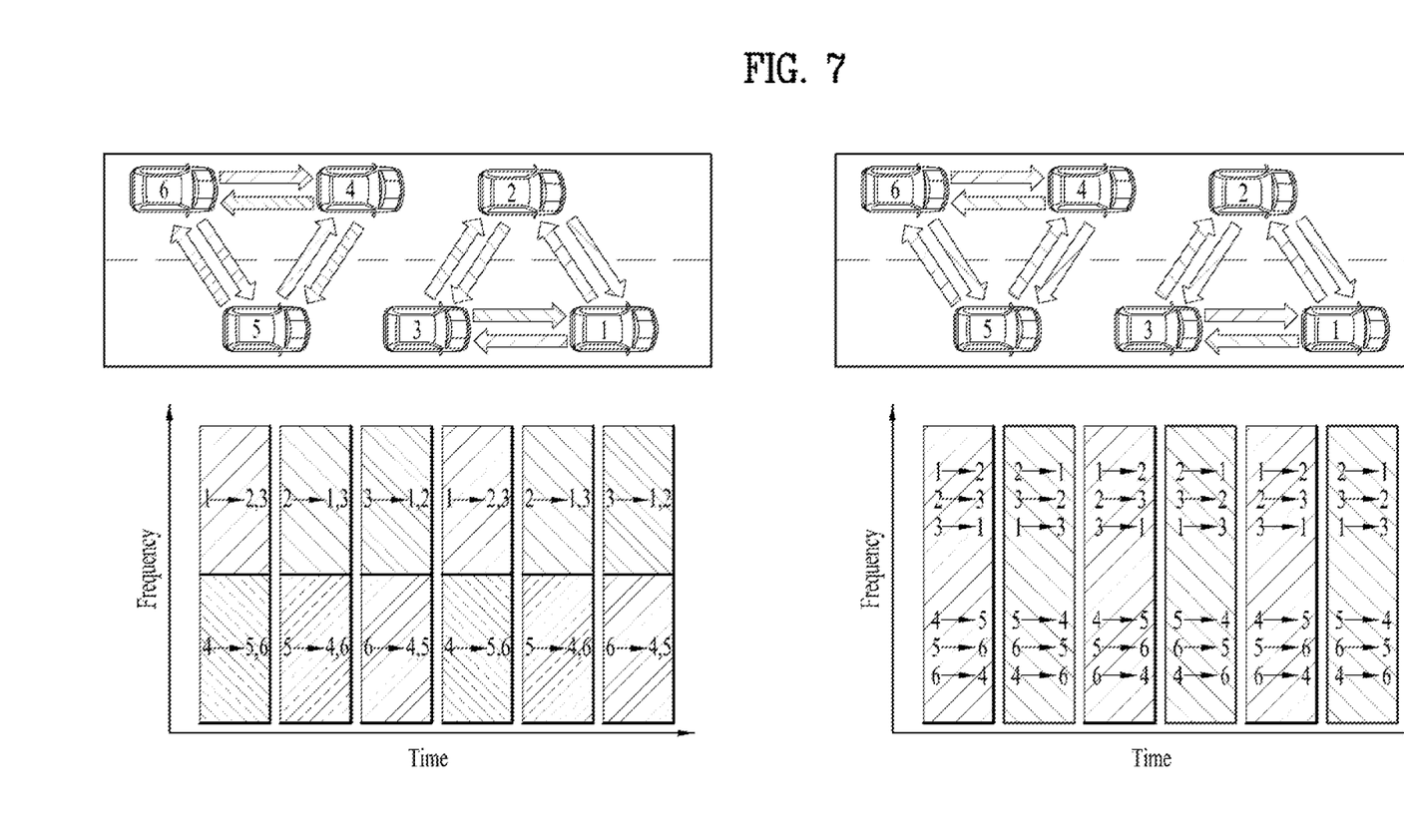
FIG. 7 is a diagram illustrating a comparison example of a case that SDD is not applied and a case that SDD is applied.

In the case that SDD is applied to a plurality of UEs, it is advantageous that transmission may be performed using more resources for more several times within a target time than the case that SDD is not applied to a plurality of UEs. FIG. 7 illustrates a comparison example of a case that SDD is not applied and a case that SDD is applied.

Referring to FIG. 7, a left drawing illustrates communication between vehicles to which SDD is not applied, and a right drawing illustrates communication between vehicles to which SDD is applied. In the case that SDD is not applied, the UE transmits a signal to different UEs in accordance with a multiplexing mode at the same time. If three UEs intend to form a communication link with their neighboring UE as shown in FIG. 7, each UE should be allocated with one transmission resource and two reception resources. If SDD is applied, the UE has only to form one transmission resource and one reception resource per communication link, the UE may perform signal transmission within a unit time for more times than the case that SDD is not applied. If SDD is applied, frequency resources are divisionally allocated to neighboring UEs that transmit signals simultaneously with the corresponding UE. If SDD is applied, since transmission signals of the respective UEs are spatially divided, the same frequency resource may be used, whereby frequency resources used by each communication link are increased.

In addition to the aforementioned advantages, since a reception UE of each communication link receives a signal by using narrow reception beams for space division, it is not likely that the UE is affected by jamming. Also, a neighboring vehicle is likely to block the signal, it is difficult to perform jamming at a long distance. As additional advantage, since a base station does not need to manage resources between communication groups to be orthogonal to resources in the communication groups, complexity in resource management of the base station is reduced.

In 3GPP TR 22.886, a scenario where 15840 vehicles exist per 1 mile is included. In this case, in order that a base station respectively manages communication links between respective vehicles, complexity of the base station is too increased. However, if SDD is applied, UEs included in the communication links have only to determine a transmission timing point and a reception timing point, complexity of the base station is reduced.

Figure 8:
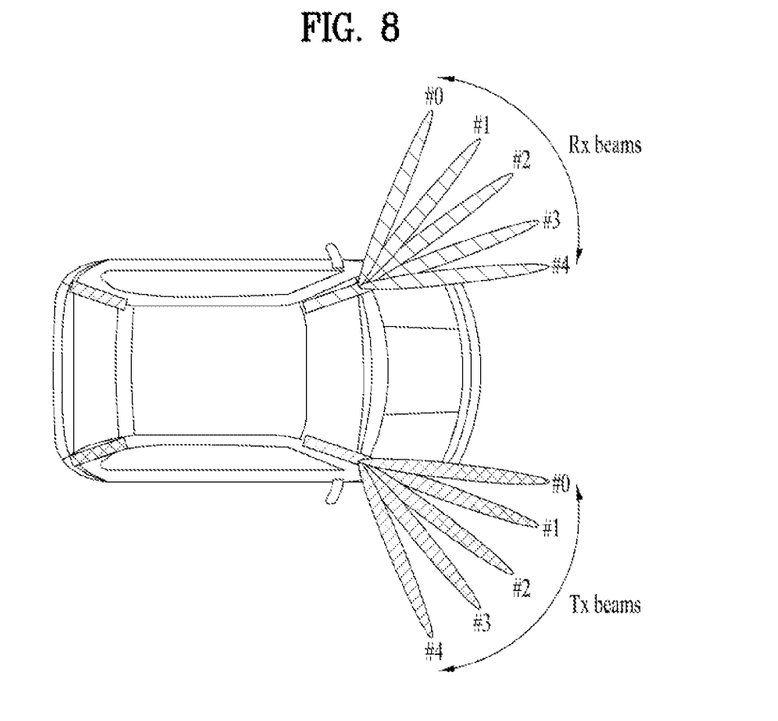
FIG. 8 is a diagram illustrating an example of interference between panels considering analog beamforming.

FIG. 8 is a diagram illustrating an example of interference between panels considering analog beamforming.

FIG. 8 relates to a case that interference between a transmission panel and a reception panel occurs in one vehicle when communication between vehicles is performed using distributed antennas, wherein it is noted that analog beamforming may be applied to each panel and interference between panels occurs in accordance with analog beamforming indexes.

As shown in FIG. 8, in the case that a panel toward A filler on a right front surface of a vehicle is given to Tx, 5 analog Tx beams (index #0, #1, #2, #3, #4) exist in this panel, a panel toward A filler on a left front surface of a vehicle is given to Rx, and 5 analog Rx beams (index #0, #1, #2, #3, #4) exist, interference between panels based on beam index of each panel may generate a total of 25 pairs as follows.

(Tx beam index, Rx beam index)={(#0,#0),(#0,#1),
(#0,#2),(#0,#3)(#0,#4), (#1,#0),(#1,#1),(#1,#2),
(#1,#3)(#1,#4), (#2,#0),(#2,#1),(#2,#2),(#2,#3)
(#2,#4), (#3,#0),(#3,#1),(#3,#2),(#3,#3)(#3,#4),
(#4,#0),(#4,#1),(#4,#2),(#4,#3)(#4,#4)}

Although FIG. 8 illustrates that one transmission panel and one reception panel are distributively arranged in a vehicle, a plurality of transmission panels and a plurality of reception panels may be arranged distributively. In this case, considering self-interference between transmission beams of each transmission panel and reception beams of each reception panel, pairing of panel and beam may be configured.

Figure 9:
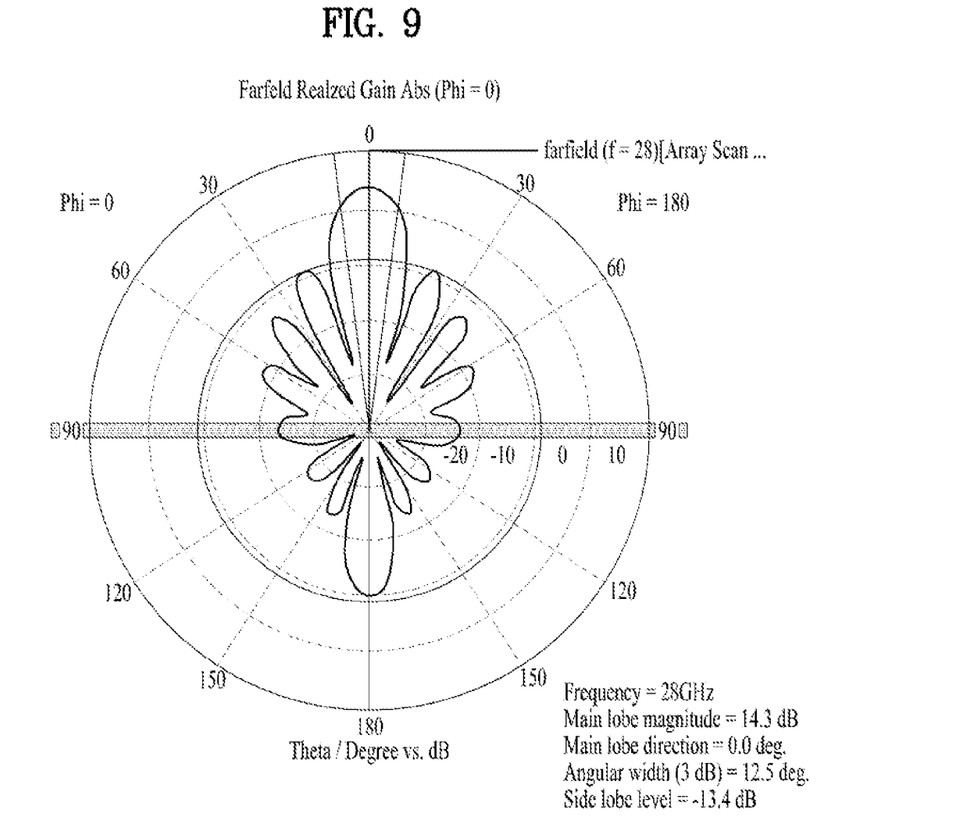
FIG. 9 is a diagram illustrating an example (antenna: Patch Antenna 8×1 Linear array with antenna distance is λ/2 (5.357 mm)) of 2D beam pattern measurement results at mmWave frequencies.

An example of a beam pattern in analog beamforming is as described in FIG. 9.

FIG. 9 is a diagram illustrating an example (antenna: Patch Antenna 8×1 Linear array with antenna distance is λ/2 (5.357 mm)) of 2D beam pattern measurement results at mmWave frequencies.

Analog beam enables actual physical beam control, and beam gain of side-robe or back-robe is varied depending on an angle of beam as shown in FIG. 9. That is, interference between panels is varied depending on beam indexes of the panels. Therefore, information (Tx beam index, Rx beam index) during SDD operation in a distributed antenna based vehicle is previously categorized based on interference between panels. If the information categorized based on interference between panels is provided to or receives from a neighboring vehicle or a base station, proper SDD considering interference between panels may be managed.

In order to effectively operate SDD in a distributed antenna based vehicle, inter-panel interference should be considered. In the present disclosure, panel/beam pair information (or various terms such as inter-panel beam pair information may be called) is configured based on inter-beam interference (or between panels/beams) information of panels previously measured. This panel/beam pair information may be used during later SDD communication through information exchange between vehicles, between a vehicle and a base station and between vehicles.

Panel/Beam Interference Measurement (or Inter-Beam Interference Measurement of Panels)

Initial Case

Inter-panel/beam interference may be categorized into long-term interference and short-term interference. Since a position of a panel in a vehicle may be fixed, inter-panel/beam interference occurring in a given position may be static. Therefore, all vehicles may have panel/beam pair information through previous measurement and calibration and tuning. Therefore, an initial value of panel/beam pair information may be measured by alternating each panel or beam. Since this may be measured when communication is not performed, final information may be generated by average information of several hours.

Periodic Case

Periodic update may be performed based on an initial value of panel/beam pair information. A temperature change of a communication RF panel may occur due to a temperature change of a vehicle, which occurs during a change of interference reflected by a moving environment of a vehicle and a position change of the vehicle. For this reason, inter-panel interference of intensity different from that of an initial value of panel/beam pair information which is previously measured may occur, whereby update of the panel/beam pair information is required periodically. For periodic update of the panel/beam pair information, measurement may be performed in a specific order (sequential order or ordering of panel/beam pair information or random order), and the panel/beam pair information may be updated.

If periodic update is performed, update of the panel/beam pair information may be affected by an inexact direction due to interference between vehicles, which occurs intermittently. Therefore, periodic update may be performed based on various cases as follows.

1. Since interference of a vehicle with a neighboring vehicle is controlled when the vehicle operates in a reception mode, a specific tone of an idle panel (for example, panel located to be opposite to a transmitting vehicle) or a reference signal RS may be transmitted, whereby update may be performed.
2. Update may be performed only when a vehicle operates in SDD mode.
3. Update may be performed only when a vehicle operates in a parking mode.
4. Update may be performed only when a vehicle is shifted from a parking mode to a starting mode.
5. Update may be performed only when there is no peripheral interference in addition to the aforementioned cases.

Non-Periodic Case

In addition to the aforementioned reasons, if update of the panel/beam pair information is required by a temporal change like the case that a reception signal from a specific Rx/panel beam is degraded, panel/beam interference may be measured and updated. Unlike the periodic update, after interference of Tx panel/beam and Rx panel/beam which are currently used or will be used is measured (by resource allocation information to be allocated by a scheduler), update of the panel/beam pair information may be performed.

Even in the case that non-periodic update is performed, update of the panel/beam pair information may be affected by an exact direction due to interference between vehicles, which occurs intermittently. Therefore, update after request may be performed based on various cases as follows.

1. Since interference of a vehicle with a neighboring vehicle is controlled when the vehicle operates in a reception mode, a specific tone of an idle panel (for example, panel located to be opposite to a transmitting vehicle) or a reference signal RS may be transmitted, whereby update after request may be performed.
2. Update after request may be performed only when a vehicle operates in SDD mode.
3. Update after request may be performed only when a vehicle operates in a parking mode.
4. Update may be performed only when a vehicle is shifted from a parking mode to a starting mode.
5. Update after request may be performed only when there is no peripheral interference in addition to the aforementioned cases.

After panel/beam interference is measured, the panel/beam pair information may be updated using the following methods.

1) The existing information and panel/beam interference information which is newly measured may be subjected to weighted sum to obtain an average value.
2) In case of best panel/beam pair information and worst panel/beam pair information, the existing information may be discarded and replaced with panel/beam interference information which is newly measured.
3) In case of intended panel/beam pair information and restricted panel/beam pair information 2. Exchange Information Exchange information may include UE ID, SDD capability (ON/OFF), distributed antenna type, and panel/beam pair information. The distributed antenna type may be as follows.

(1) Case that a distributed antenna is built using only an upper portion of a vehicle
(2) Case that a distributed antenna is built in front, side and rear directions as well as the upper portion of the vehicle
(3) Case that a distributed antenna is built in front, side and rear directions of a vehicle.

The panel beam pair information may be as follows.

(1) Best panel/beam pair information {(Tx panel index, Rx panel index) and/or (Tx beam index, Rx beam index)}
(2) Worst panel/beam pair information {(Tx panel index, Rx panel index) and/or (Tx beam index, Rx beam index)}
(3) Intended panel/beam pair information {(Tx panel index, Rx panel index) and/or (Tx beam index, Rx beam index) and/or Interference amount and/or order}
(4) Restricted panel/beam pair information {(Tx panel index, Rx panel index) and/or (Tx beam index, Rx beam index) and/or Interference amount and/or order}
(5) Tx panel index and Rx panel index values of the aforementioned information may be obtained by one panel index and/or combination of N (N>1) panel indexes.
(6) Tx beam index and Rx beam index values of the aforementioned information may be obtained by one beam index and/or combination of N (N>1) beam indexes.
(7) When higher M(M>1) information of the restricted panel/beam pair information and/or the intended panel/beam pair information is stored, only a difference of each interference may be stored to reduce the amount of information.

3. Information Exchange Between Vehicles or Reporting of Information to Serving TRP 1) Broadcasting Periodic Case Broadcasting may be performed to correspond to a period only if panel/beam pair information is updated based on a measured value by a predefined threshold value or a predefined update rule, or broadcasting may always be performed periodically regardless of this case. A vehicle may broadcast the measured value with a given periodic value through broadcasting resources of a sidelink. However, broadcasting may be performed only if the panel/beam pair information is updated based on the measured value of a reporting period value given to reduce power consumption of a vehicle or avoid waste of frequency resources in the vehicle by the predefined threshold value or the predefined update rule. Broadcasting may not be performed if not so. Whether to transmit the measured value through broadcasting may be determined by the vehicle. At this time, the vehicle may transmit a difference between the value transmitted through broadcasting and the value previously measured/reported or report the measured value as it is.

Non-Periodic Case (Event Trigger)

Broadcasting may be performed to correspond to a period only if panel/beam pair information is updated based on a measured value by a predefined threshold value or a predefined update rule, or broadcasting may be performed if an error occurs in a preset threshold value as compared with a previously measured/reported value. A vehicle may receive information on broadcasting resources allocated by a request to a base station based on event-trigger without broadcasting the measured value with a given period value through broadcasting resources of a sidelink and broadcast the measured value through the allocated resources. That is, broadcasting may be performed by a request to a base station only if the panel/beam pair information is updated or if an error occurs in a preset threshold value as compared with the previously measured/reported value.

2) Information Between Two Vehicles

Periodic Case

Information may be delivered to a target vehicle to correspond to a period only if panel/beam pair information is updated based on a measured value by a predefined threshold value or a predefined update rule, or information may always be delivered to a target vehicle periodically regardless of this case. A vehicle may deliver the measured value with a given periodic value to a target vehicle through P2P resources of a sidelink. However, the measured value may be delivered only if the panel/beam pair information is updated based on the measured value of a reporting period value given to reduce power consumption of a vehicle or avoid waste of frequency resources in the vehicle by the predefined threshold value or the predefined update rule. The measured value not be transferred if not so. Whether to transmit the measured value to the target vehicle may be determined by the vehicle that provides the measured value. At this time, the vehicle may transmit a difference between the measured value and the value previously measured/reported or report the measured value as it is.

Non-Periodic Case (Event Trigger)

Information may be delivered only if panel/beam pair information is updated based on a measured value by a predefined threshold value or a predefined update rule, or information may be delivered to a target vehicle only if an error occurs in a preset threshold value as compared with a previously measured/reported value. A vehicle may request a base station of the measured information based on even-trigger without delivering the measured value with a given period value through P2P resources of a sidelink, and then may be allocated with sidelink resources for information delivery and deliver information to the target vehicle. That is, information may be delivered to the target vehicle by a request to a base station only if the panel/beam pair information is updated or only if a preset error (or difference) occurs as compared with the previously measured/reported value.

Reporting of Information to Serving TRP

Periodic Case

Reporting may be performed to correspond to a period only if panel/beam pair information is updated based on a measured value by a predefined threshold value or a predefined update rule, or reporting may always be performed periodically regardless of this case.

A vehicle may transmit the measured value with a given periodic value to a serving TRP through PUCCH or PUSCH. However, the measured value may be transmitted to a base station at a corresponding period only if the panel/beam pair information is updated based on the measured value of a reporting period value given to reduce power consumption of a vehicle or avoid waste of frequency resources in the vehicle by the predefined threshold value or the predefined update rule. The measured value may not be reported to the base station if not so. Whether to transmit the measured value to the base station may be determined by the vehicle. At this time, the vehicle may transmit a difference value between the measured value and the value previously measured/reported or report the measured value as it is.

Non-Periodic Case (Event Trigger)

Reporting may be performed only if panel/beam pair information is updated based on a measured value by a predefined threshold value or a predefined update rule, or reporting may be performed if a preset error (or difference) occurs as compared with a previously measured/reported value.

A vehicle may request a base station of the measured value based on event-trigger without transmitting the measured value with a given period value through PUCCH or PUSCH and report the measured value. That is, reporting may be performed by a request to the base station only if the panel/beam pair information is updated or if a preset error (or difference) occurs as compared with the previously measured/reported value.

Use of Panel/Beam Pair Information

A candidate set may be reduced using panel/beam pair information during panel/beam pairing for V2V communication between vehicles. A candidate set may be reduced using panel/beam pair information during panel/beam pairing for communication between a vehicle and a base station.

For example, a base station or UE may determine a higher Nth panel/beam considering the aforementioned restricted panel/beam and perform reporting without feeding back one best panel/beam during panel beam pairing for V2V communication.

The aforementioned methods may selectively operate only when SDD operates between vehicles.

For SDD operation between vehicles, when a specific vehicle simultaneously desires DL reception and UL transmission, or when a specific vehicle simultaneously desires transmission to a neighboring vehicle while performing DL reception from gNB, or when a specific vehicle simultaneously desires reception from a neighboring vehicle while desiring UL transmission to gNB, the above methods may selectively operate.

In communication between a vehicle and gNB (an example of a base station in 5G communication system), since DL traffic is generally more than UL traffic, in order that a vehicle operates in SDD, vehicles which desire transmission to a neighboring vehicle while performing DL reception may partially operate in SDD, and at this time, the above methods may selectively operate.

Since more traffic delivered from a preceding vehicle to a following vehicle generally exists in communication between vehicles, in order that a vehicle operates in SDD, vehicles which desire transmission of information from a following vehicle to a preceding vehicle in an environment such as platooning (that is, a group of vehicles managed in a state that continuous vehicles are maintained to be close to each other through vehicle spacing control) may partially operate in SDD, and at this time, the above methods may selectively operate.

For example, the gNB may trigger control signal transmission of a vehicle through a physical layer or higher layer signal such that the gNB may predict a sustain time for SDD operation of a UE through a buffer status report (BSR) of a vehicle and receive necessary information from the vehicle at a desired time.

Examples of the above-described suggested method may be considered as one method for implementing the present disclosure. Also, although the above-described suggested methods may be implemented independently, some of the above-described suggested methods may be implemented in the form of combination (or merge). A rule may be defined such that information on whether the suggested methods are applied (or information on rules related to the suggested methods) should be transmitted from a BS to a UE through a predefined signal (e.g., physical layer signal, higher layer signal, etc.).

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for performing communication based on inter-panel interference by a distributed antenna based communication device is industrially applicable to various wireless communication systems such as 5G communication system.

The invention claimed is:

1. A method for performing communication based on inter-panel interference by a distributed antenna-based communication device, the method comprising:
measuring interference between transmission beams of a transmission panel and reception beams of a reception panel;
configuring inter-panel beam pair information by pairing the beams of the transmission panel and the beams of the reception panel on the basis of the measurement; and
transmitting the inter-panel beam pair information to a base station or a neighboring communication device.

2. The method of claim 1, wherein the inter-panel beam pair information includes one or more of pair information of a transmission beam index of the transmission panel and a reception beam index of the reception panel.

3. The method of claim 2, wherein the inter-panel beam pair information includes a best pair or a worst pair, and the best pair is a pair of a best transmission beam index and the reception beam index and the worst pair is a pair of a worst transmission beam index and the reception beam index.

4. The method of claim 1, wherein the inter-panel beam pair information is transmitted periodically.

5. The method of claim 1, wherein the inter-panel beam pair information is transmitted non-periodically if a specific condition is satisfied.

6. The method of claim 1, wherein the specific condition is satisfied when a predetermined difference occurs between an inter-beam interference measurement value of panels and an inter-beam interference measurement value of previous panels.

7. The method of claim 1, wherein the communication device includes a vehicle.

8. The method of claim 1, wherein the transmission beams correspond to analog transmission beams, and the reception beams correspond to analog reception beams.

9. The method of claim 1, wherein the inter-panel beam pair information is transmitted through a physical uplink control channel (PUCCH) or a physical uplink shared CH (PUSCH).

10. The method of claim 1, wherein the transmission panel operates in a transmission mode, and the reception panel operates in a reception mode.

11. A distributed antenna based communication device for performing communication based on inter-panel interference, the distributed antenna based communication device comprising:
a transmission panel;
a reception panel; and
a processor configured to measure interference between transmission beams of the transmission panel and reception beams of the reception panel and configured to configure inter-panel beam pair information by pairing the beams of the transmission panel and the beams of the reception panel based on the measured result,
wherein the processor is configured such that the transmission panel transmits the inter-panel beam pair information to a base station or a neighboring communication device.

12. The distributed antenna based communication device of claim 11, wherein the inter-panel beam pair information includes one or more of pair information of a transmission beam index of the transmission panel and a reception beam index of the reception panel.

13. The distributed antenna based communication device of claim 12, wherein the inter-panel beam pair information includes a best pair or a worst pair, and the best pair is a pair of a best transmission beam index and the reception beam index and the worst pair is a pair of a worst transmission beam index and the reception beam index.

14. The distributed antenna based communication device of claim 11, wherein the inter-panel beam pair information is transmitted periodically.

15. The distributed antenna based communication device of claim 11, wherein the inter-panel beam pair information is transmitted non-periodically if a specific condition is satisfied.

16. The distributed antenna based communication device of claim 11, wherein the distributed antenna based communication device is capable of communicating with at least one of neighboring communication device, a communication device related to an autonomous driving vehicle, the base station or a network.

\* \* \* \* \*